United States Patent
Blackert et al.

[15] 3,652,157
[45] Mar. 28, 1972

[54] MICROFILM PROJECTION APPARATUS

[72] Inventors: John E. Blackert; Harvey S. Towers, both of Webster, N.Y.

[73] Assignee: Xerox Corporation, Rochester, N.Y.

[22] Filed: Aug. 13, 1969

[21] Appl. No.: 849,674

[52] U.S. Cl. ..................................355/49, 355/45, 355/11, 353/26
[51] Int. Cl. .......................................G03l 27/46
[58] Field of Search ..................353/26; 355/44, 45, 47, 48, 355/49

[56] References Cited

UNITED STATES PATENTS

| | | |
|---|---|---|
| 2,347,938 | 5/1944 | Dimmick ................................355/48 |
| 2,130,562 | 10/1938 | Pratt ......................................353/26 |
| 2,532,542 | 12/1950 | d'Avitaya ..............................355/48 |
| 2,939,362 | 6/1960 | Cole .....................................355/47 |

Primary Examiner—Samuel S. Matthews
Assistant Examiner—E. M. Bero
Attorney—Donald E. Daley, James J. Ralabate and Terry J. Anderson

[57] ABSTRACT

A transparent rotatable cylinder having spaced support flanges and seats therein for supporting a strip of microfilm and the like a small distance from the cylinder while the microfilm is being projected onto an image plane. A projector lamp is located adjacent the cylinder on the side of the cylinder opposite the image plane to illuminate the microfilm as it is fed in a path concentric with the surface of the cylinder between the cylinder and the image plane.

1 Claims, 3 Drawing Figures

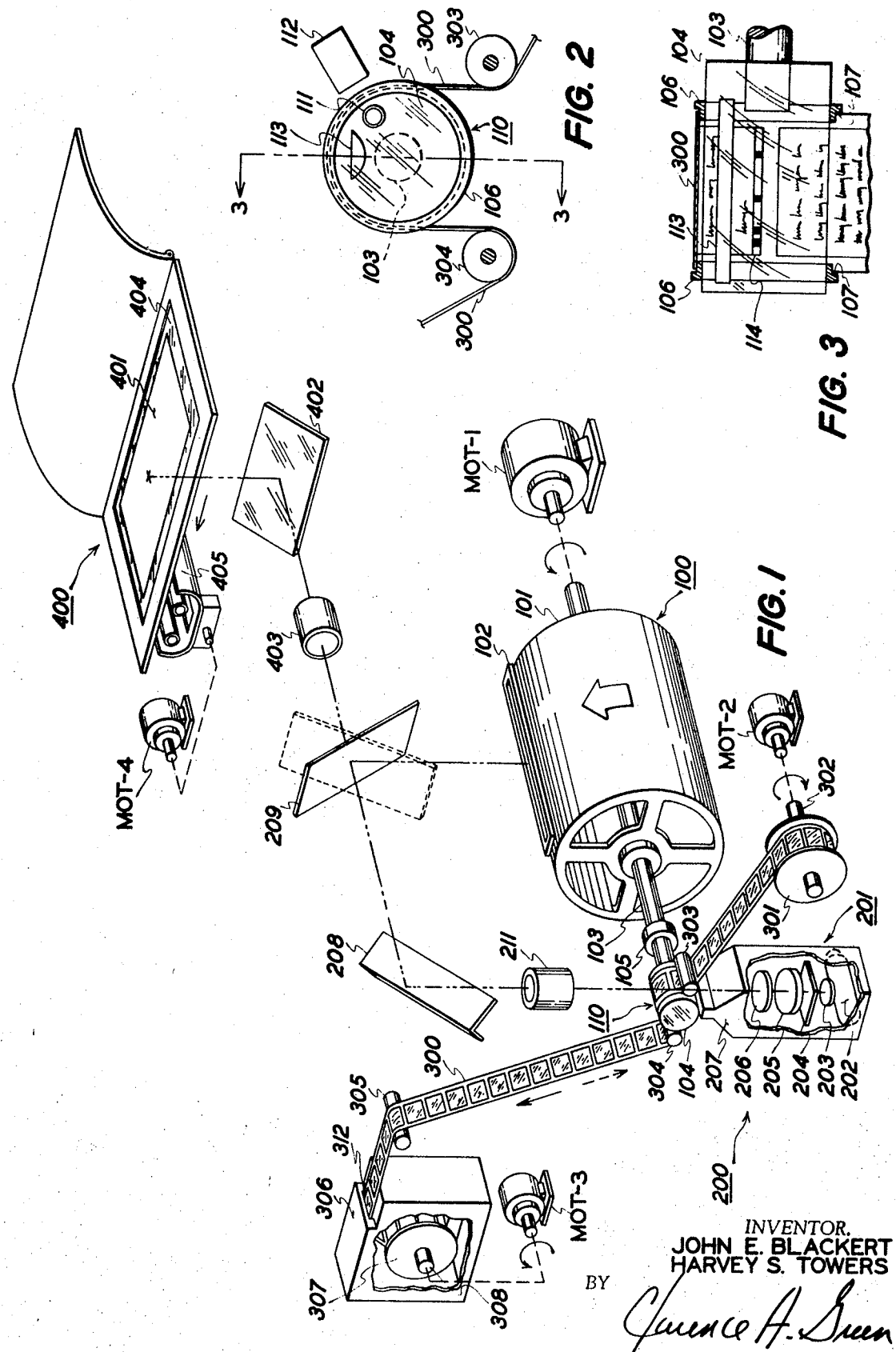

MICROFILM PROJECTION APPARATUS

BACKGROUND OF THE INVENTION

This invention relates generally to reproducing microfilm images, and more particularly, to a device for supporting and driving a strip of microfilm and the like while the information thereon is being projected onto a photosensitive member.

One of the most widely used techniques presently employed to store large quantities of information in a relatively small space is to maintain such information on strips of microfilm. These strips, which can be made of a photosensitive material such as photographic film and can be rolled into a compact reel for storage, contain a multitude of individual image frames, each of which can accommodate a reduced size image of one or many originals. When information is stored in this manner, a copy of the original can be reproduced quite easily as needed from the microfilm strip by merely projecting the particular image frame desired onto a photosensitive member and processing the member to make the image visible and permanent. In reproduction systems such as those employing the xerographic process, the apparatus can be made continuous and automatic by using a photosensitive member in the shape of a drum which is rotatable through the exposure station.

Due to the wide use of microfilm as a data storage method, ordinary copying machines such as those used in the business office environment have been adapted to reproduce information on microfilm as well as reproduce original documents. In such duo-input copiers, one system of reproduction can be used to copy in both modes of input, microfilm and original documents, by positioning each mode of input so that a light image formed from it can be aligned with the exposure station of the photosensitive member. There are many known scanning systems which are able to scan an original document and synchronously place a light image of it onto the moving photosensitive drum. However, there is a great need for a reliable and simple projecting system which synchronously projects a microfilm image onto a photosensitive drum and at the same time is compatible with an original document scanning system in the same copier.

Microfilm has been projected while moving the strip across a flat, transparent, stationary platen. A disadvantage of this system of projection is that elaborate and expensive control apparatus must be utilized to assure that the movement of the microfilm strip is synchronously timed with the movement of the photosensitive member. A further problem with this type of arrangement is that, as the microfilm strip moves relative to the platen, it accumulates a charge on its surface from continuously contacting the platen. This charge, in turn, attracts foreign matter onto the film surface which can reproduce onto the copy sheet, and further, can injure the film when it is rewound into a roll for storage.

SUMMARY OF THE INVENTION

Accordingly, it is an object of the invention to improve reproduction apparatus which makes copies from microfilm and the like.

It is another object of the invention to improve microfilm projection apparatus by supporting the strip of microfilm on a transparent cylinder assembly during projection.

It is another object of the invention to improve microfilm projection apparatus by minimizing contact between the microfilm and its support apparatus during projection.

It is another object of the invention to improve microfilm reproduction apparatus by moving the microfilm support apparatus at the same speed as the photosensitive member in the reproduction apparatus during projection.

It is another object of the invention to improve microfilm projection apparatus by providing a simple, reliable and inexpensive apparatus to synchronize a light image projected from a strip of microfilm with a rotating photosensitive drum.

These and other objects of the invention are attained by a rotatable transparent cylinder having two spaced flanges thereon which support and control the movement of a strip of microfilm as it is being projected onto a rotating photosensitive drum in a reproduction system. The flanges on the cylinder are spaced a distance approximately equal to the width of the strip of microfilm and contain a seat in which the edge of the microfilm is placed to support it at a small distance from the surface of the cylinder. The movement of the strip of microfilm through the projection apparatus is controlled by the movement of the transparent cylinder and take up and storage spools. The transparent cylinder is rotatable on the same axis as the photosensitive drum and through a clutch device can be made to rotate with the photosensitive drum to synchronize the movement of the light image formed from the microfilm with the movement of the drum surface. The spools operate in cooperation with the rotation of the transparent cylinder when the microfilm is being projected to apply tension to the microfilm in the vicinity of the transparent cylinder to assure that there is substantially no relative movement between the transparent cylinder and microfilm.

Other objects of the invention will become readily apparent to those skilled in the art in view of the following detailed disclosure and description thereof, especially when read in conjunction with the accompanying drawings.

BRIEF DESCRIPTION OF THE DRAWINGS

FIG. 1 is a schematic illustration of the invention in a duo-input reproduction system.

FIG. 2 is an end view of the microfilm support device.

FIG. 3 is a section view of the microfilm support device taken through sections 3—3 of FIG. 2.

DESCRIPTION OF THE PREFERRED EMBODIMENT

The projection apparatus described herein can be used with any reproduction system wherein a strip of microfilm, or the like, is projected onto a photosensitive member; however, for the purpose of this disclosure, the microfilm projection apparatus is described within the environment of a xerographic copier which is adapted to copy both microfilm and original documents.

FIG. 1 is a schematic illustration of a copier which reproduces both original documents and microfilm. As can be seen in this figure, photosensitive drum 101, the element upon which the image to be reproduced is formed, is exposed to a light pattern produced by either microfilm projecting apparatus 200 or original document scanning apparatus 400 by selectively positioning mirror 209. When mirror 209 is in the position shown in solid lines, a light image formed by the microfilm projecting apparatus 200 is exposed onto the photosensitive drum 101 to the exclusion of any light image simultaneously produced by scanning apparatus 400. In the alternative, when mirror 209 is in the position shown in dotted lines, a light image formed by the scanning apparatus 400 is exposed onto the drum 101 to the exclusion of any light simultaneously formed on the microfilm projecting apparatus 200. The position of mirror 209 can be selected manually by the operator of the copier by a handle (not shown) extending from the mirror to the outside of the machine, or can be adjusted automatically by any suitable apparatus (not shown) when the operator of the machine selects the mode of the operation of the copier to either microfilm or original document reproduction. Although not shown in the drawings, the various elements of the copier are mounted on a suitable frame member.

The reproduction system used in the copier can be any suitable type which utilizes a photosensitive member to form an image. For instance, the copying apparatus can be a xerographic system having an electrostatic drum 101 and various xerographic processing stations (not shown) arranged about its periphery. For instance, the periphery of drum 101 includes a photosensitive multilayer covering which comprises a photoconductor material, such as vitreous selenium, over a suitable conductive material. The xerographic processing stations can be any known devices which allow the reproduction process to be carried out continuously. For example, these stations can include a charging station, exposure station, developing station, transfer station and cleaning station.

The photosensitive surface of drum 101 first passes through the charging station where it is given a uniform electrostatic charge. Then, the charged surface passes through the exposure station where it is exposed to a light image formed from either the microfilm or original document input. This light image dissipates the charge on the drum in the light areas to form a latent electrostatic image on the drum conforming to the image being reproduced. The latent image is then developed by the application of a pigmented powder to the drum surface as it passes through the developing station to make the latent image visible. Next, the powder image is transferred from the surface of the drum to a copy sheet which is fed from a supply of sheets onto the drum in the transfer station. Finally, before the drum surface passes through the charging station again, its surface is cleaned of any residue powder as it passes through the cleaning station.

Because the photosensitive member is in the shape of a drum, the reproduction processes described above can be carried out continuously as the drum rotates through the various stations. For simplicity, FIG. 1 shows only aperture plate 102, at the exposure station, and the photosensitive drum 101 of the xerographic system described above. As drum 101 rotates in the counterclockwise direction as indicated by the arrow a light image passes through the plate and is exposed onto the surface of the drum in synchronism with the movement thereof.

The reproduction system depicted in FIG. 1 is adapted to copy original documents as well as microfilm by selecting the position of mirror 209. When mirror 209 is positioned as shown in dotted lines a light image produced by the scanning device 400 is directed through a lens and mirror system onto the drum 101. Scanning device 400 includes a transparent platen 404, upon which an original document 401 is supported, and a scanning mechanism 405 containing illuminating means to illuminate successive portions of the original document as the mechanism moves in the direction shown by the arrow. Any suitable mechanism (not shown) can be employed to support the scanning mechanism as it is driven across the platen by motor MOT-4. The light image created by the scanning mechanism 405 is reflected by mirror 402 through focusing lens 403 and then reflected by mirror 209 through the aperture plate and onto the surface of drum 101. Focusing lens 403 is also supported on a translating mechanism (not shown) to move relative to the platen 404 in timed relation to the movement of drum 101 and the illuminating portion of scanning mechanism 405 to project a flowing image of the original document 401 onto the surface of drum 101.

The microfilm copying capability of the reproduction system shown in FIG. 1 is attained by employing microfilm projection apparatus 200. The term "microfilm" is used as a generic term herein, and encompasses any type of information storage device which can be projected to form a light image of the information thereon. For instance, the device can be a transparency which has transparent, or translucent background areas with opaque image areas or, in the alternative, opaque background areas with transparent image areas. The strip of microfilm and images created thereon can be made by any suitable process such as by known photographic techniques; however, it is not intended that the process be limited to photographic techniques.

The projection apparatus 200 contains a microfilm support device 110 and an illuminating device 201 which, respectively, supports and projects the microfilm to form a light image of the information on the microfilm. The illuminating device includes any suitable light source such as lamp 202, a condensing lens system made up of lenses 203, 205 and 206 which focus the light produced by lamp 202 on the microfilm, filter 204 which prevents light in the infrared range from reaching the microfilm to eliminate the possibility of deleteriously overheating the microfilm during illumination, and housing 207 which encloses all the elements mentioned above.

The microfilm support device 110 is located adjacent the illuminating device 201 and includes a transparent rotatable cylinder having two flanges which support the microfilm during illumination. The microfilm strip is transported to and from the support device by a spool-to-spool arrangement. During projection the film is fed in the direction shown by the solid arrow in FIG. 1 from spool 301 onto the support device and then to spool 307. The microfilm is supported by the support device 110 so that light from the illuminating device projects the information on the microfilm towards focusing lens 207. The light image passes through enlarging lens 211, onto mirror 208, and onto mirror 209, which finally reflects it to the surface of the photosensitive drum 101. The enlarging lens magnifies the image projected onto the photosensitive drum so that the copy produced is the same size as the original information placed on the microfilm. The diameter of the transparent cylinder with respect to the diameter of the photosensitive drum determines the ratio of microfilm speed to drum surface speed and thus determines image magnification. For example, the diameter of the photosensitive drum shown in FIG. 1 is approximately 7.942 inches and the diameter of the microfilm support device 110 is approximately 1.182 inches. The microfilm itself is approximately 0.004 inch thick, therefore, the image is projected at a diameter of approximately 1.19 inches. In this case, the magnification of lens 211 should be 6.67× the same as the ratio of the two diameters.

A more detailed view of the microfilm support device 110 is shown in FIGS. 2 and 3. Referring to FIG. 2, transparent cylinder 104 is supported and driven by shaft 103 when the microfilm is being projected. The cylinder is preferably transparent to permit light from illuminating device (not shown in this figure) to readily pass through it to the microfilm. Mounted securely about the periphery of the cylinder are two ring-shaped support flanges 106 which turn with the cylinder and support the microfilm a small distance above the surface of the cylinder. As can be seen in FIG. 3, each flange has a seat 107 positioned on the side of the flange nearest the center of the cylinder so that the seats face each other. The microfilm is supported on the seats while being illuminated thereby minimizing the area of contact between the surface of the microfilm and the support device during projection. The seats are placed sufficiently far apart to allow the microfilm strip to be fed onto and removed from the flange with ease as the cylinder turns.

The microfilm strip is supported a small distance from the periphery of the cylinder rather than in contact therewith in order to keep the surface of the microfilm free of charge. If the microfilm strip is permitted to contact the surface of the cylinder it has been found that a charge builds up on the microfilm material. As a result of this charge build up, foreign matter is attracted to the film surface and the presence of such foreign matter is undesirable since it could be ground into the microfilm material to cause scratching and excessive wear thereto, especially as the microfilm is wound around the spool. In addition, the foreign matter would reproduce onto the copy sheet and cause background on the reproduction.

Referring to FIG. 2, the strip of microfilm is wrapped around approximately half the periphery of the microfilm support device 110. Since only that portion of the microfilm adjacent field lens 113 is actually being projected onto the photosensitive drum, the strip of microfilm must necessarily be located in the seats of the flanges 106 at least in this vicinity. However, to be certain that the strip of microfilm is properly seated adjacent the field lens, and that there is adequate surface contact between the flanges and microfilm to assure a steady, positive driving force on the strip by the support device, the strip is preferably maintained in contact with as much as the flange periphery as practical without blocking the illumination passing through the cylinder. This condition is shown in FIG. 2. The angle of wrap of the microfilm strip is ultimately determined by the positions of guide rollers 303 and 304 which hold the strip tightly against the support device.

In addition to the elements described above, the support device also contains a microfilm detection device which is employed to read code marks on each microfilm frame so that a copy sheet can be fed to the transfer station of the drum 101 (shown in FIG. 1) in synchronization with the image on the drum. Code marks on the microfilm and the detection device must be compatible with each other. For instance, a code 114, in this case a transparency pattern, can be placed in the leading portion of each frame on the strip of microfilm as shown in FIG. 3. This code pattern can be detected by a lamp and photocell arrangement such as that shown in FIG. 2. The code can be any suitable type which can be detected by a lamp and photocell arrangement such as a series of opaque dots and areas at the leading edge of the frame. When this type of code is used in the frames, the code scanner must be distinguished between the code and the image. This can be done by selecting a code which has an extremely low probability of being seen in the image. A strip of microfilm can have several bits of information on it such as a code to indicate the leading edge of the strip, the trailing edge of the strip, a code for each frame on the strip to synchronize the feeding of the copy sheet, etc.

The code detection device shown is a lamp 111 located inside the transparent cylinder and a bank of photocells adjacent the path of the microfilm strip. As a code on a particular frame passes between the lamp and the bank of photocells, the pattern of opaque areas in the code produce a corresponding light pattern which activates selected photocells in the bank. The signal produced by the bank of photocells can then be used to start the feeding of the copy sheet toward the transfer station of the drum 101.

The operation of the apparatus during each microfilm strip reproduction cycle includes two general phases; a take up phase and an imaging phase. Referring to FIG. 1, the microfilm strip is wound at a relatively fast rate of speed in the direction shown by the broken arrow from the storage spool 307 to the take up spool 301 during the take up phase in preparation for the imaging phase. Then, during the imaging phase, the microfilm strip is fed in the direction indicated by the solid arrow from the take up spool back towards the storage spool at a rate of speed synchronous with the speed of drum 101. Take up spool 301 is permanently attached to the copier and is driven through shaft 302 in the clockwise direction as shown by the arrow by motor MOT-2 while storage spool 307, which is removable from the copier, is driven through shaft 308 in the counterclockwise direction, as shown by the arrow, by motor MOT-3.

The first step in using the copier in the microfilm reproduction mode is to place a spool 307 of microfilm on shaft 308 and feed the leading edge of the strip through the opening 312 in the housing 306, the other end of the strip being attached to the spool. Then, a leader strip (not shown in the figure), which is permanently attached to spool 301 at one end, is fed between guide roller 303 and microfilm support device 110, around the periphery of the device, between the cylinder and guide rollers 304 and over the roller 305 to the vicinity of opening 312. The free end of the leader strip is adapted to be removably joined to the leading edge of the strip of microfilm by any suitable arrangement such as a simple manual splice (not shown), and is employed to guide the microfilm strip through the projection apparatus during the take up phase of the operation.

During the take up phase, motor MOT-2, an AC motor is operated at its rated speed to wind the microfilm around spool 301 at a relatively fast rate while motor MOT-3, a DC motor, provides a slight drag on the microfilm strip. Clutch 105, which joins the microfilm support device 110 to the shaft 103 of drum 101, is disengaged during the take up phase so that the microfilm support device 110 can turn freely at this time. After all the frames to be reproduced have traveled over the support device 110 and are located on the take up spool side of the support device, the imaging phase can begin. As mentioned above, code marks on the microfilm strip indicate when the last frame on the strip has been brought over the support device and a suitable control device can stop the take up phase in response to the code. The film is stopped with a minimum overshoot by dynamically braking motor MOT-3 and allowing the inertia of motor MOT-2 to provide a force on the strip in the direction to maintain tension on it.

During the imaging phase, clutch 105 is engaged and the transparent cylinder and photosensitive drum turn together. During this time motor MOT-3 drives spool 307 at a slower speed than spool 301 is driven during the take up phase to carry each frame in the strip over the microfilm support device 110 for projection. The speed of the spool 307 during the imaging phase is such that the microfilm strip and transparent cylinder move together at the same speed through the light generated by lamp 202. Synchronism between the movement of the strip of microfilm 300 and the drum 101 is attained due to the fact that the strip moves at the same speed as the transparent cylinder and the cylinder, in turn, moves at the same speed as the drum 101 since clutch 105 is engaged. During the imaging phase, a DC current is placed on motor MOT-2 which acts as a drag or tension force on the strip of microfilm. This drag force equalizes the tension on the strip 300 on both sides of the microfilm support device 110 to assure that the microfilm remains synchronized with the cylinder during projection.

It is intended that appropriate drive means and control devices be associated with the copying system described herein, however, each specific drive means and control device is not described in detail since any suitable type can be used which would allow the system to function as described above.

In addition to the apparatus outlined above, many other modifications and/or additions to this invention will be readily apparent to those skilled in the art upon reading this disclosure, and these are intended to be encompassed within the invention disclosed and claimed herein.

What is claimed is:

1. In a reproduction system having a drum with a photosensitive surface supported on a drum shaft which is rotatable in a frame, an exposure station adjacent the photosensitive drum at which a light image of information to be reproduced is exposed onto the surface of the drum to produce an image thereof, and means to rotate the drum shaft to bring successive portions of the drum surface through the exposure station, apparatus for projecting microfilm information onto the photosensitive surface of the drum comprising:
   a. a rotatable transparent cylinder adapted to transmit illumination therethrough and supported by a cylinder shaft having a centerline coincident with that of the drum shaft;
   b. means to connect the cylinder shaft to the drum shaft so that the cylinder and drum rotate together;
   c. support means on the cylinder adapted to support the strip of microfilm at a gap from the surface of the cylinder;
   d. illumination means adjacent the cylinder on the side of the centerlines of the cylinder and drum shafts opposite the exposure station adapted to direct light through the cylinder;
   e. a system of reflectors to reflect the light which passes through the cylinder to the exposure station;
   f. means to position the microfilm strip on the supporting means between the support means and system of reflectors; and
   g. control means to connect the cylinder shaft and drum shaft during projection of the microfilm so that the cylinder and drum rotate together thereby attaining synchronization between the movement of the microfilm and drum surface.

* * * * *